United States Patent
Zhou (10) Patent No.: US 10,943,584 B2
(45) Date of Patent: Mar. 9, 2021

(54) SPEECH RECOGNITION METHOD, SPEECH WAKEUP APPARATUS, SPEECH RECOGNITION APPARATUS, AND TERMINAL

(71) Applicant: Huawei Technologies Co., Ltd., Shenzhen (CN)

(72) Inventor: Junyang Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/729,097

(22) Filed: Oct. 10, 2017

(65) Prior Publication Data

US 2018/0033436 A1   Feb. 1, 2018

Related U.S. Application Data

(63) Continuation of application No. PCT/CN2015/076342, filed on Apr. 10, 2015.

(51) Int. Cl.
*G10L 15/22* (2006.01)
*G10L 15/00* (2013.01)
(Continued)

(52) U.S. Cl.
CPC .......... *G10L 15/22* (2013.01); *G10L 15/00* (2013.01); *G10L 15/02* (2013.01);
(Continued)

(58) Field of Classification Search
CPC ... G10L 15/08; G10L 15/19; G10L 2015/223; G10L 15/32
(Continued)

(56) References Cited

U.S. PATENT DOCUMENTS 5,774,859 A * 6/1998 Houser .............. H04N 5/44543
348/E5.103
5,857,172 A * 1/1999 Rozak ...................... G06F 3/16
704/275
(Continued)

FOREIGN PATENT DOCUMENTS

CN   102196096 A   9/2011
CN   102905029 A   1/2013
(Continued)

*Primary Examiner* — Daniel Abebe
(74) *Attorney, Agent, or Firm* — Leydig, Voit & Mayer, Ltd.

(57) ABSTRACT

Embodiments of the present invention provide a speech recognition method and a terminal. The method includes: listening, by a speech wakeup apparatus, to speech information in a surrounding environment; when determining that the speech information obtained by listening matches a speech wakeup model, buffering, by the speech wakeup apparatus, speech information, of first preset duration, obtained by listening, and sending a trigger signal for triggering enabling of a speech recognition apparatus, where the trigger signal is used to instruct the speech recognition apparatus to read and recognize the speech information buffered by the speech wakeup apparatus; and recognizing first speech information buffered by the speech wakeup apparatus and the second speech information obtained by listening, to obtain a recognition result.

21 Claims, 5 Drawing Sheets

(51) Int. Cl.
*G10L 15/02* (2006.01)
*H04M 1/725* (2021.01)
(52) U.S. Cl.
CPC ....... *G10L 2015/223* (2013.01); *H04M 1/725* (2013.01); *H04M 1/72569* (2013.01)
(58) Field of Classification Search
USPC .............................. 704/704, 251, 270.1, 275
See application file for complete search history.

(56) References Cited

U.S. PATENT DOCUMENTS

| | | | |
|---|---|---|---|
| 6,591,239 B1* | 7/2003 | McCall | A61B 90/35 |
| | | | 704/275 |
| 8,775,191 B1 | 7/2014 | Sharifi et al. | |
| 9,275,637 B1* | 3/2016 | Salvador | G10L 15/01 |
| 9,697,822 B1* | 7/2017 | Naik | G10L 15/063 |
| 9,728,188 B1* | 8/2017 | Rosen | G10L 15/22 |
| 9,818,407 B1* | 11/2017 | Secker-Walker | G10L 15/32 |
| 10,074,371 B1* | 9/2018 | Wang | G10L 15/22 |
| 2002/0082844 A1* | 6/2002 | Van Gestel | G06F 3/16 |
| | | | 704/275 |
| 2005/0091057 A1* | 4/2005 | Phillips | G10L 15/22 |
| | | | 704/270.1 |
| 2006/0241948 A1 | 10/2006 | Abrash et al. | |
| 2008/0140397 A1* | 6/2008 | Millman | G09B 17/006 |
| | | | 704/235 |
| 2010/0049516 A1 | 2/2010 | Talwar et al. | |
| 2010/0228540 A1 | 9/2010 | Bennett | |
| 2011/0069024 A1 | 3/2011 | Kim | |
| 2011/0165541 A1* | 7/2011 | Liu | G09B 5/04 |
| | | | 434/169 |
| 2013/0080167 A1* | 3/2013 | Mozer | G10L 15/22 |
| | | | 704/246 |
| 2013/0085755 A1* | 4/2013 | Bringert | G10L 15/28 |
| | | | 704/235 |
| 2013/0110521 A1 | 5/2013 | Hwang et al. | |
| 2013/0289994 A1* | 10/2013 | Newman | G10L 15/22 |
| | | | 704/254 |
| 2013/0325484 A1* | 12/2013 | Chakladar | G06F 3/167 |
| | | | 704/275 |
| 2014/0122087 A1* | 5/2014 | Macho | G10L 17/22 |
| | | | 704/275 |
| 2014/0136205 A1* | 5/2014 | Jang | H04L 12/282 |
| | | | 704/249 |
| 2014/0163978 A1* | 6/2014 | Basye | G10L 15/28 |
| | | | 704/233 |
| 2014/0169795 A1* | 6/2014 | Clough | G06F 19/3418 |
| | | | 398/106 |
| 2014/0172423 A1* | 6/2014 | Dai | G10L 15/22 |
| | | | 704/231 |
| 2014/0222436 A1* | 8/2014 | Binder | G06F 3/167 |
| | | | 704/275 |
| 2014/0229184 A1* | 8/2014 | Shires | H04L 12/12 |
| | | | 704/275 |
| 2014/0270258 A1* | 9/2014 | Wang | G06F 3/167 |
| | | | 381/110 |
| 2014/0281628 A1* | 9/2014 | Nigam | G06F 1/3206 |
| | | | 713/323 |
| 2014/0297287 A1* | 10/2014 | Newman | G10L 15/08 |
| | | | 704/275 |
| 2014/0358535 A1 | 12/2014 | Lee et al. | |
| 2014/0358552 A1* | 12/2014 | Xu | G06F 1/3231 |
| | | | 704/275 |
| 2014/0365225 A1* | 12/2014 | Haiut | G10L 15/22 |
| | | | 704/275 |
| 2015/0039311 A1* | 2/2015 | Clark | G10L 15/063 |
| | | | 704/244 |
| 2015/0142438 A1* | 5/2015 | Dai | G10L 17/22 |
| | | | 704/246 |
| 2015/0161997 A1* | 6/2015 | Wetsel | G06F 3/167 |
| | | | 704/275 |
| 2015/0245154 A1* | 8/2015 | Dadu | G06F 3/167 |
| | | | 381/56 |
| 2015/0302855 A1* | 10/2015 | Kim | G10L 17/22 |
| | | | 704/275 |
| 2015/0302856 A1* | 10/2015 | Kim | G10L 17/22 |
| | | | 704/273 |
| 2015/0363165 A1* | 12/2015 | Zhou | G06F 3/167 |
| | | | 715/728 |
| 2015/0373455 A1* | 12/2015 | Donaldson | G10L 15/08 |
| | | | 381/79 |
| 2015/0379992 A1* | 12/2015 | Lee | G10L 15/22 |
| | | | 704/275 |
| 2016/0012827 A1* | 1/2016 | Alves | H04R 3/005 |
| | | | 381/71.1 |
| 2016/0055847 A1* | 2/2016 | Dahan | G10L 15/22 |
| | | | 704/275 |
| 2016/0077574 A1* | 3/2016 | Bansal | G06F 1/3215 |
| | | | 704/275 |
| 2016/0077792 A1* | 3/2016 | Bansal | G06F 3/167 |
| | | | 704/275 |
| 2016/0078862 A1* | 3/2016 | Joyce | G10L 15/08 |
| | | | 704/274 |
| 2016/0085564 A1* | 3/2016 | Arcese | G06F 9/4451 |
| | | | 726/7 |
| 2016/0086609 A1* | 3/2016 | Yue | G10L 17/02 |
| | | | 704/239 |
| 2016/0148615 A1* | 5/2016 | Lee | G10L 15/22 |
| | | | 704/275 |
| 2016/0240194 A1* | 8/2016 | Lee | G06F 1/3206 |
| 2016/0322045 A1* | 11/2016 | Hatfield | G10L 15/22 |
| 2016/0322053 A1 | 11/2016 | Dai et al. | |
| 2016/0379635 A1* | 12/2016 | Page | G10L 15/22 |
| | | | 704/251 |
| 2017/0076720 A1* | 3/2017 | Gopalan | G06F 3/167 |
| 2017/0133012 A1* | 5/2017 | Ho | G10L 15/22 |
| 2018/0108001 A1* | 4/2018 | Taylor | G06Q 20/206 |
| 2019/0156818 A1* | 5/2019 | Piersol | G10L 15/08 |

FOREIGN PATENT DOCUMENTS

| | | |
|---|---|---|
| CN | 103021413 A | 4/2013 |
| CN | 103095911 A | 5/2013 |
| CN | 103338311 A | 10/2013 |
| CN | 103594089 A | 2/2014 |
| CN | 103595869 A | 2/2014 |
| CN | 103632667 A | 3/2014 |
| CN | 103929540 A | 7/2014 |
| CN | 104301109 A | 1/2015 |
| CN | 105204963 A | 12/2015 |
| EP | 2669889 A2 | 12/2013 |
| EP | 2816554 A2 | 12/2014 |
| EP | 2899955 A1 | 7/2015 |
| JP | 2015501450 A | 1/2015 |
| JP | 2015041123 A | 3/2015 |
| JP | 2015520409 A | 7/2015 |
| JP | 2017520012 A | 7/2017 |
| KR | 20060057811 A | 5/2006 |
| WO | 2013163113 A1 | 10/2013 |
| WO | 2015094369 A1 | 6/2015 |
| WO | 2015164047 A1 | 10/2015 |

\* cited by examiner

SPEECH RECOGNITION METHOD, SPEECH WAKEUP APPARATUS, SPEECH RECOGNITION APPARATUS, AND TERMINAL

CROSS-REFERENCE TO RELATED APPLICATIONS

This application is a continuation of International Application No. PCT/CN2015/076342, filed on Apr. 10, 2015, the disclosure of which is hereby incorporated by reference in its entirety.

TECHNICAL FIELD

Embodiments of the present invention relate to the field of mobile communications technologies, and in particular, to a speech recognition method, a speech wakeup apparatus, a speech recognition apparatus, and a terminal.

BACKGROUND

At present, with increasing popularity of a mobile handheld terminal, in particular, a mobile phone, touchscreen technologies are also becoming increasingly mature. Although the touchscreen technologies facilitate an operation of a user, multiple touch steps need to be performed to complete call interaction, and a call may be missed when the user is driving or is not convenient to perform a touch.

Therefore, functions such as making a call or sending an SMS message based on speech recognition technologies emerge. In addition, at present, as a new and important user interaction technology, speech recognition is increasingly widely applied to mobile terminals.

However, current services such as making a call or sending an SMS message based on the speech recognition technologies can be implemented only when the touchscreen technologies are used cooperatively.

SUMMARY

Embodiments of the present invention provide a speech recognition method, a speech wakeup apparatus, a speech recognition apparatus, and a terminal. A user needs to send only one instruction, and requirements of the user can be met. The user does not need a help of a touchscreen and does not need to enter multiple instructions either.

According to a first aspect, an embodiment of the present invention provides a speech recognition method, and the method includes:

listening, by a speech wakeup apparatus, to speech information in a surrounding environment; and when determining that the speech information obtained by listening matches a speech wakeup model, buffering, by the speech wakeup apparatus, speech information, of first preset duration, obtained by listening, and sending a trigger signal for triggering enabling of a speech recognition apparatus, where the trigger signal is used to instruct the speech recognition apparatus to read and recognize the speech information buffered by the speech wakeup apparatus, after the speech recognition apparatus is enabled.

With reference to the first aspect, in a first possible implementation manner of the first aspect, the determining that the speech information obtained by listening matches a speech wakeup model includes:

when the speech information obtained by listening matches predetermined wakeup speech information, determining that the speech information obtained by listening matches the speech wakeup model.

With reference to the first aspect, in a second possible implementation manner of the first aspect, the determining that the speech information obtained by listening matches a speech wakeup model includes:

when the speech information obtained by listening matches predetermined wakeup speech information, extracting a voiceprint feature in a speech signal obtained by listening, determining that the extracted voiceprint feature matches a predetermined voiceprint feature, and determining that the speech information obtained by listening matches the speech wakeup model.

According to a second aspect, an embodiment of the present invention provides a speech recognition method, and the method includes:

receiving, by a speech recognition apparatus, a trigger signal sent by a speech wakeup apparatus, where the trigger signal is used to instruct the speech recognition apparatus to enable itself and recognize first speech information buffered by the speech wakeup apparatus;

after receiving the trigger signal, enabling, by the speech recognition apparatus, itself and listening to second speech information of second preset duration; and recognizing the first speech information buffered by the speech wakeup apparatus and the second speech information obtained by listening, to obtain a recognition result.

With reference to the second aspect, in a first possible implementation manner of the second aspect, after the speech recognition apparatus obtains the recognition result, the method further includes:

performing, by the speech recognition apparatus, matching between the obtained recognition result and pre-stored speech instruction information; and performing, by the speech recognition apparatus, an operation corresponding to matched speech instruction information.

With reference to the second aspect or the first possible implementation manner of the second aspect, in a second possible implementation manner of the second aspect, the method further includes:

when determining that the trigger signal is not received again within third preset duration after the trigger signal is received, automatically disabling, by the speech recognition apparatus, itself.

According to a third aspect, an embodiment of the present invention provides a speech recognition method, and the method includes:

listening, by a speech wakeup apparatus, to speech information in a surrounding environment; and when determining that the speech information obtained by listening matches a speech wakeup model, sending, by the speech wakeup apparatus, a trigger signal for triggering enabling of a speech recognition apparatus.

With reference to the third aspect, in a first possible implementation manner of the third aspect, the determining that the speech information obtained by listening matches a speech wakeup model includes:

when the speech information obtained by listening matches predetermined wakeup speech information, determining that the speech information obtained by listening matches the speech wakeup model.

With reference to the third aspect, in a second possible implementation manner of the third aspect, the determining that the speech information obtained by listening matches a speech wakeup model includes:

when the speech information obtained by listening matches predetermined wakeup speech information, extracting a voiceprint feature in a speech signal obtained by listening, determining that the extracted voiceprint feature matches a predetermined voiceprint feature, and determining that the speech information obtained by listening matches the speech wakeup model.

According to a fourth aspect, an embodiment of the present invention provides a speech recognition method, and the method includes:

receiving, by a speech recognition apparatus, a trigger signal sent by a speech wakeup apparatus;

enabling, by the speech recognition apparatus after receiving the trigger signal, itself and sending a speech prompt instruction to a user; and recording, by the speech recognition apparatus, a speech signal entered by the user according to the speech prompt instruction, and performing recognition on the speech signal to obtain a recognition result.

According to a fifth aspect, an embodiment of the present invention further provides a speech wakeup apparatus, and the apparatus includes:

a listening module, configured to listen to speech information in a surrounding environment;

a determining module, configured to determine whether the speech information obtained by listening by the listening module matches a speech wakeup model;

a buffer module, configured to: when the determining module determines that the speech information obtained by listening by the listening module matches the speech wakeup model, buffer speech information, of first preset duration, obtained by listening by the listening module; and a sending module, configured to send a trigger signal for triggering enabling of a speech recognition apparatus, where the trigger signal is used to instruct the speech recognition apparatus to read and recognize the speech information buffered by the speech wakeup apparatus, after the speech recognition apparatus is enabled.

With reference to the fifth aspect, in a first possible implementation manner of the fifth aspect, the determining module is specifically configured to: when determining that the speech information obtained by listening matches predetermined wakeup speech information, determine that the speech information obtained by listening matches the speech wakeup model.

With reference to the fifth aspect, in a second possible implementation manner of the fifth aspect, the apparatus further includes:

an extraction module, configured to: when the determining module determines that the speech information obtained by listening matches predetermined wakeup speech information, extract a voiceprint feature in a speech signal obtained by listening; where the determining module is further configured to: when determining that the voiceprint feature extracted by the extraction module matches a predetermined voiceprint feature, determine that the speech information obtained by listening matches the speech wakeup model.

According to a sixth aspect, an embodiment of the present invention provides a speech recognition apparatus, including:

a receiving module, configured to receive a trigger signal sent by a speech wakeup apparatus, where the trigger signal is used to instruct the speech recognition apparatus to enable itself and recognize first speech information buffered by the speech wakeup apparatus;

a listening module, configured to: after the receiving module receives the trigger signal, enable itself and listen to second speech information of second preset duration; and a recognition module, configured to recognize the first speech information buffered by the speech wakeup apparatus and the second speech information obtained by listening by the listening module to obtain a recognition result.

With reference to the sixth aspect, in a first possible implementation manner of the sixth aspect, the apparatus further includes:

a matching module, configured to perform matching between the recognition result obtained after the recognition module performs recognition and pre-stored speech instruction information; and an execution module, configured to perform an operation corresponding to matched speech instruction information.

With reference to the sixth aspect or the first possible implementation manner of the sixth aspect, in a second possible implementation manner of the sixth aspect, the apparatus further includes:

a disabling module, configured to: when the trigger signal is not received again within third preset duration after the trigger signal is received, disable the speech recognition module.

According to a seventh aspect, an embodiment of the present invention provides a speech wakeup apparatus, including:

a listening module, configured to listen to speech information in a surrounding environment;

a determining module, configured to determine whether the speech information obtained by listening matches a speech wakeup model; and a sending module, configured to: when the determining module determines that the speech information obtained by listening matches the speech wakeup model, send a trigger signal for triggering enabling of a speech recognition apparatus.

With reference to the seventh aspect, in a first possible implementation manner of the seventh aspect, the determining module is specifically configured to: when determining that the speech information obtained by listening matches predetermined wakeup speech information, determine that the speech information obtained by listening matches the speech wakeup model.

With reference to the seventh aspect, in a second possible implementation manner of the seventh aspect, the apparatus further includes:

an extraction module, configured to: when the determining module determines that the speech information obtained by listening matches predetermined wakeup speech information, extract a voiceprint feature in a speech signal obtained by listening; where the determining module is specifically configured to: when determining that the extracted voiceprint feature matches a predetermined voiceprint feature, determine that the speech information obtained by listening matches the speech wakeup model.

According to an eighth aspect, an embodiment of the present invention provides a speech recognition apparatus, including:

a receiving module, configured to receive a trigger signal sent by a speech wakeup apparatus;

a sending module, configured to: after the receiving module receives the trigger signal, enable itself and send a speech prompt instruction to a user; and a processing module, configured to record a speech signal entered by the user according to the speech prompt instruction, and recognize the speech signal to obtain a recognition result.

According to a ninth aspect, an embodiment of the present invention provides a terminal, including:

a speech wakeup apparatus and a speech recognition apparatus; where the speech wakeup apparatus is configured to: listen to speech information in a surrounding environment; when determining that the speech information obtained by listening matches a speech wakeup model, buffer first speech information obtained by listening within first preset duration, and send a trigger signal for triggering enabling of the speech recognition apparatus; and the speech recognition apparatus is configured to: after receiving the trigger signal sent by the speech wakeup apparatus, enable itself and listen to second speech information within second preset duration, and recognize the first speech information buffered by the speech wakeup apparatus and the second speech information obtained by listening to obtain a recognition result.

With reference to the ninth aspect, in a first possible implementation manner of the ninth aspect, the speech wakeup apparatus is a digital signal processor DSP.

With reference to the ninth aspect or the first possible implementation manner of the ninth aspect, in a second possible implementation manner of the ninth aspect, the speech recognition apparatus is an application processor AP.

By using solutions provided in the embodiments of the present invention, a user needs to send only one instruction, and requirements of the user can be met. In addition, the solutions are applicable regardless of whether a terminal is in a standby state or in a non-standby state. In addition, a speech wakeup apparatus buffers speech information obtained by listening, and a speech recognition apparatus listens to second speech information after being enabled, and recognizes buffered first speech information and the second speech information, so that a loss of partial speech information sent by the user before the speech recognition apparatus is enabled can be avoided when the speech recognition apparatus starts to obtain speech information after being woken up.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiments of the present invention provide a speech recognition method, a speech wakeup apparatus, a speech recognition apparatus, and a terminal. A user needs to send only one instruction, and requirements of the user can be met. The user does not need a help of a touchscreen and does not need to enter multiple instructions either. The method and the apparatus are based on a same inventive concept. Because principles for resolving a problem by the method and the apparatus are similar, implementation of the terminal, the apparatus, and the method may refer to each other, and repeated description is not provided.

Figure 1:
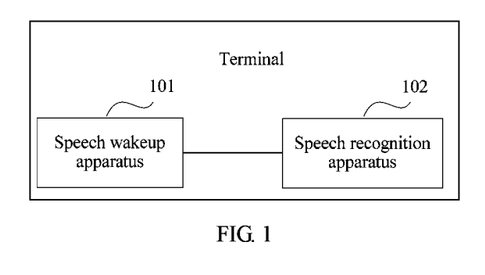
FIG. 1 is a schematic structural diagram of a terminal according to an embodiment of the present invention.

An embodiment of the present invention provides a terminal. As shown in FIG. 1, the terminal includes a speech wakeup apparatus 101 and a speech recognition apparatus 102.

The speech wakeup apparatus 101 may be implemented by using a digital signal processor (DSP for short). The speech recognition apparatus 102 may be implemented by using an application processor (AP for short). The speech recognition apparatus 102 may be further implemented by using a central processing unit (CPU for short).

The speech wakeup apparatus 101 is configured to: listen to speech information in a surrounding environment; when determining that the speech information obtained by listening matches a speech wakeup model, buffer first speech information obtained by listening within first preset duration, and send a trigger signal for triggering enabling of the speech recognition apparatus.

The speech recognition apparatus 102 is configured to: after receiving the trigger signal sent by the speech wakeup apparatus, enable itself and listen to second speech information within second preset duration, and recognize the first speech information buffered by the speech wakeup apparatus and the second speech information obtained by listening, to obtain a recognition result.

Optionally, when determining that the trigger signal is not received again within third preset duration after the trigger signal is received, the speech recognition apparatus 102 automatically disables itself.

By using solutions provided in this embodiment of the present invention, a user needs to send only one instruction, and requirements of the user can be met. In addition, the solutions are applicable regardless of whether a terminal is in a standby state or in a non-standby state. In addition, a speech wakeup apparatus buffers speech information obtained by listening, and a speech recognition apparatus listens to second speech information after being enabled, and recognizes buffered first speech information and the second speech information, so that a loss of partial speech information sent by the user before the speech recognition apparatus is enabled can be avoided when the speech recognition apparatus starts to obtain speech information after being woken up.

Specifically, generally after a DSP initiates a trigger signal, after being enabled, an AP enables a record channel to perform recording. Generally, the recording is started after the AP is enabled. However, in this solution, before the AP is enabled, the DSP starts to perform recording and buffering when receiving wakeup information. After being enabled, the AP continues to perform recording to obtain speech information, and then recognizes speech information read from a DSP buffer and the speech information obtained after the AP is enabled. In a One Shot scenario, there is a time difference from waking up the DSP to sending an instruction by the DSP. If recording is performed after the AP is enabled, only speech information after the AP is enabled can be recorded, and speech information within the foregoing time difference is lost. However, if recording is started and buffered when the DSP is woken up, the speech information within the foregoing time difference can be obtained.

For example, a time point for starting to speak a wakeup word is t0, a time point for finishing speaking the wakeup word is t1, a time point for starting to speak a command word is t2, and a time point for enabling the AP is t3. The buffer includes speech information from t0 to t3. However, if recording is performed only when the AP is enabled, only speech information after t3 can be recorded, and speech information from t0 to t3 cannot be recorded. Therefore, in the solution provided in this embodiment of the present invention, speech information after speech information used for wakeup can be obtained, and a speech information loss is avoided, thereby improving speech recognition.

Optionally, the following manners may be specifically used to determine that the speech information obtained by listening matches the speech wakeup model:

A first implementation manner:

when the speech information obtained by listening matches predetermined wakeup speech information, the speech information obtained by listening matches the speech wakeup model.

A user can set wakeup speech information in the speech wakeup apparatus according to a prompt in advance, for example: Hi, little E. Alternatively, wakeup speech information is preset in a terminal at the time of factory delivery. When detecting speech information in a surrounding environment, the speech wakeup apparatus compares the speech information with stored wakeup speech information. If the two are the same, the speech information matches the speech wakeup model, and a trigger instruction is sent to the speech recognition apparatus 102; or if the two are different, the speech wakeup apparatus 101 may discard currently detected speech information, and continue to perform detection and determining work.

A second implementation manner:

when the speech information obtained by listening matches predetermined wakeup speech information, a voiceprint feature in a speech signal obtained by listening is extracted, the extracted voiceprint feature matches a predetermined voiceprint feature, and the speech information obtained by listening matches the speech wakeup model.

The voiceprint feature includes one or more of the following features:

an acoustic parameter that reflects the voiceprint feature, such as a pitch contour, a linear prediction coefficient, a spectral envelope parameter, a harmonic energy ratio, a resonant peak frequency and its bandwidth, a cepstrum (also referred to as a power cepstrum), or a Mel-frequency cepstrum coefficient (MFCC for short). This embodiment is not limited to the foregoing mentioned voiceprint feature parameters.

A setting apparatus may be further included in this embodiment of the present invention. A voiceprint feature of a user is pre-extracted and stored into the speech wakeup apparatus. For example, the user may record speech information inside a setting module according to a prompt, then extract a voiceprint feature, and store the extracted voiceprint feature into the speech wakeup apparatus.

By using the solutions provided in this embodiment of the present invention, a voiceprint feature is added into a wakeup model, so that noise in a surrounding environment and speech input of other users can be filtered out, and a speech wakeup apparatus can provide reliable security for a user.

Optionally, after the speech recognition apparatus obtains the recognition result, the speech recognition apparatus performs matching between the obtained recognition result and pre-stored speech instruction information; the speech recognition apparatus controls execution of an operation corresponding to matched speech instruction information.

The speech instruction information is pre-stored in the speech recognition apparatus. The speech recognition apparatus includes multiple pieces of speech instruction information.

An execution module performing an operation corresponding to speech instruction information may be further included in this embodiment of the present invention. The speech recognition apparatus may send an execution instruction to the execution module that performs the operation corresponding to the speech instruction information. For example, a loudspeaker, a light-emitting apparatus, or the like is included.

For example, when detecting that speech information in a surrounding environment satisfies the wakeup model, a speech wakeup module buffers first speech information of first preset duration, such as 2s, triggers a speech recognition module to enable itself and listen to second speech information, then recognizes the buffered first speech information and the second speech information, and fuzzily compares a recognition result with the speech instruction information to determine whether the speech information matches one piece of the speech instruction information. For example, the speech instruction information includes speech instruction information that instructs to play a ringtone or MP3, such as "Play a ringtone" or "Play MP3"; or includes speech instruction information that instructs to make an answer, such as "Where are you?"; or includes speech instruction information that instructs to light up a camera flash, such as "turn on a camera flash".

A terminal device such as a mobile phone may be searched for by using the solution provided in this embodiment of the present invention. At home, generally the mobile phone is placed randomly, and it takes some time to find the mobile phone if needed for use. By using the solution provided in this embodiment of the present invention, "Hello, little E, where are you?" can be spoken out. Therefore, a speech wakeup module in the mobile phone detects the speech information, and performs matching between the speech information and a speech wakeup model (for example, wakeup speech information is "Hello, little E").

When the speech information matches the speech wakeup model, the speech information is buffered into a Buffer, and a trigger signal is sent to a speech recognition module. The speech recognition module enables itself and starts to listen to speech information, then recognizes the buffered speech information and the speech information obtained by listening, to obtain a recognition result (a text result is "Hello, little E, where are you"), and performs matching between the text result and speech instruction information. For example, if speech instruction information that matches the "Hello, little E, where are you" is play MP3, MP3 music is played to prompt a user.

A call may be made by using the solution provided in this embodiment of the present invention. Regardless of whether a mobile phone is in a standby state or in a screen-locked state, a speech wakeup module of the mobile phone is always in an enabled state, so that speech information sent by a user can be obtained by listening, for example, "Hello, little E, call little A". Then, a call can be directly made, and any other operations are not needed.

Figure 2:
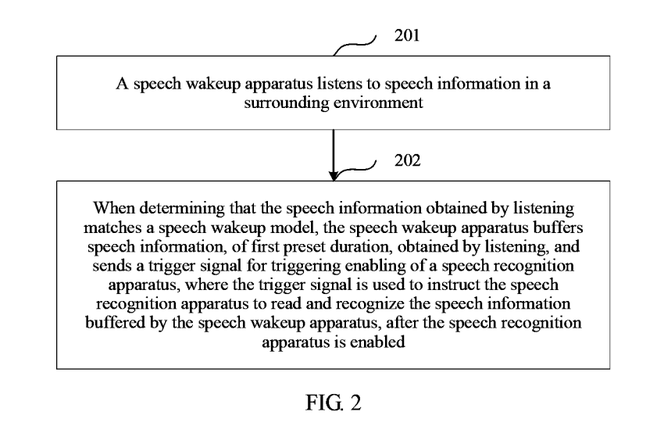
FIG. 2 is a flowchart of a speech recognition method according to an embodiment of the present invention.

An embodiment of the present invention further provides a speech recognition method. As shown in FIG. 2, the method includes:

Step 201: A speech wakeup apparatus listens to speech information in a surrounding environment.

Step 202: When determining that the speech information obtained by listening matches a speech wakeup model, the speech wakeup apparatus buffers speech information, of first preset duration, obtained by listening, and sends a trigger signal for triggering enabling of a speech recognition apparatus, where the trigger signal is used to instruct the speech recognition apparatus to read and recognize the speech information buffered by the speech wakeup apparatus, after the speech recognition apparatus is enabled.

By using solutions provided in this embodiment of the present invention, a user needs to send only one instruction, and requirements of the user can be met. In addition, the solutions are applicable regardless of whether a terminal is in a standby state or in a non-standby state. In addition, speech information obtained by listening is buffered, and a speech recognition apparatus is enabled and the speech recognition apparatus listens to speech information, and then recognizes the buffered speech information and the speech information obtained by listening, so that a loss of partial speech information can be avoided when the speech recognition apparatus starts to obtain speech information after being woken up, and speech recognition is improved.

Optionally, the following manners may be specifically used to determine that the speech information obtained by listening matches the speech wakeup model:

A first implementation manner:

when the speech information obtained by listening matches predetermined wakeup speech information, the speech information obtained by listening matches the speech wakeup model.

A second implementation manner:

when the speech information obtained by listening matches predetermined wakeup speech information, a voiceprint feature in a speech signal obtained by listening is extracted, the extracted voiceprint feature matches a predetermined voiceprint feature, and the speech information obtained by listening matches the speech wakeup model.

Figure 3:
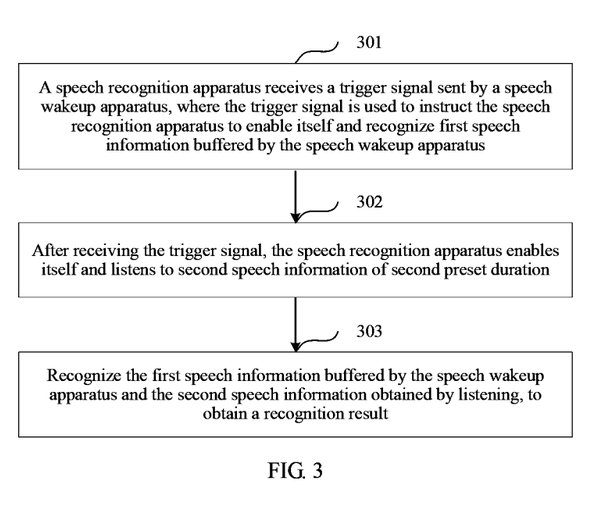
FIG. 3 is another flowchart of a speech recognition method according to an embodiment of the present invention.

An embodiment of the present invention further provides a speech recognition method. As shown in FIG. 3, the method includes:

Step 301: A speech recognition apparatus receives a trigger signal sent by a speech wakeup apparatus, where the trigger signal is used to instruct the speech recognition apparatus to enable itself and recognize first speech information buffered by the speech wakeup apparatus.

Step 302: After receiving the trigger signal, the speech recognition apparatus is enabled and the speech recognition apparatus listens to second speech information of second preset duration.

Step 303: Recognize the first speech information buffered by the speech wakeup apparatus and the second speech information obtained by listening, to obtain a recognition result.

By using solutions provided in this embodiment of the present invention, a user needs to send only one instruction, and requirements of the user can be met. In addition, the solutions are applicable regardless of whether a terminal is in a standby state or in a non-standby state. In addition, speech information obtained by listening is buffered, and a speech recognition apparatus is enabled and the speech recognition apparatus listens to speech information, and then recognizes the buffered speech information and the speech information obtained by listening, so that a loss of partial speech information can be avoided when the speech recognition apparatus starts to obtain speech information after being woken up, and speech recognition is improved.

Optionally, after the speech recognition apparatus obtains the recognition result, the method further includes:

performing, by the speech recognition apparatus, matching between the obtained recognition result and pre-stored speech instruction information; and controlling, by the speech recognition apparatus, execution of an operation corresponding to matched speech instruction information.

Optionally, when determining that the trigger signal is not received again within third preset duration after the trigger signal is received, the speech recognition apparatus automatically disables itself.

Figure 4:
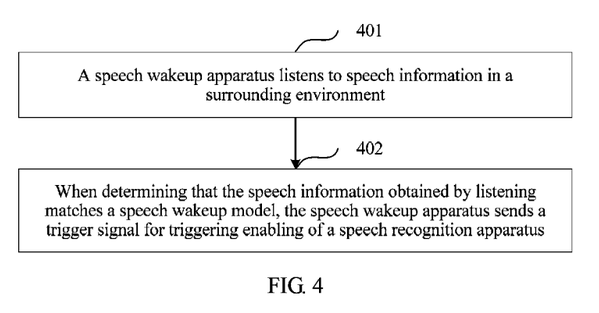
FIG. 4 is still another flowchart of a speech recognition method according to an embodiment of the present invention.

An embodiment of the present invention further provides a speech recognition method. As shown in FIG. 4, the method includes:

Step 401: A speech wakeup apparatus listens to speech information in a surrounding environment.

Step 402: When determining that the speech information obtained by listening matches a speech wakeup model, the speech wakeup apparatus sends a trigger signal for triggering enabling of a speech recognition apparatus.

Optionally, the following manners may be specifically used to determine that the speech information obtained by listening matches the speech wakeup model:

A first implementation manner:

when the speech information obtained by listening matches predetermined wakeup speech information, the speech information obtained by listening matches the speech wakeup model.

A second implementation manner:

when the speech information obtained by listening matches predetermined wakeup speech information, a voiceprint feature in a speech signal obtained by listening is extracted, the extracted voiceprint feature matches a predetermined voiceprint feature, and the speech information obtained by listening matches the speech wakeup model.

By using solutions provided in this embodiment of the present invention, a user needs to send only one instruction, and requirements of the user can be met. In addition, the solutions are applicable regardless of whether a terminal is in a standby state or in a non-standby state. In addition, speech information obtained by listening is buffered, and a speech recognition apparatus enables itself and listens to speech information, and then recognizes the buffered speech information and the speech information obtained by listening, so that a loss of partial speech information can be avoided when the speech recognition apparatus starts to obtain speech information after being woken up, and speech recognition is improved.

Figure 5:
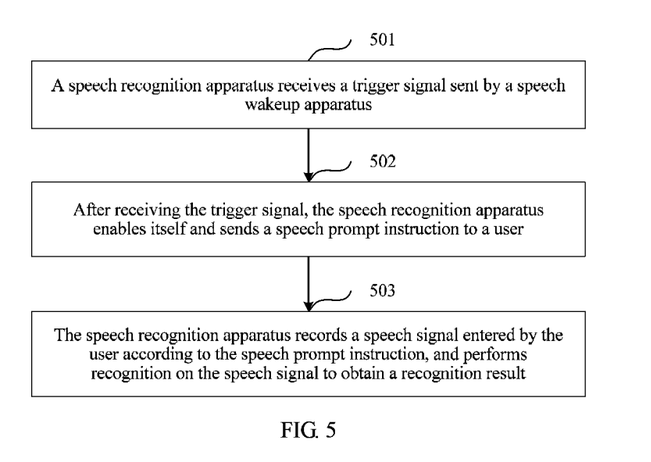
FIG. 5 is yet still another flowchart of a speech recognition method according to an embodiment of the present invention.

An embodiment of the present invention further provides a speech recognition method. As shown in FIG. 5, the method includes:

Step 501: A speech recognition apparatus receives a trigger signal sent by a speech wakeup apparatus.

Step 502: After receiving the trigger signal, the speech recognition apparatus enables itself and sends a speech prompt instruction to a user.

Step 503: The speech recognition apparatus records a speech signal entered by the user according to the speech prompt instruction, and recognizes the speech signal to obtain a recognition result.

By using solutions provided in this embodiment of the present invention, a user needs to send only one instruction, and requirements of the user can be met. In addition, the solutions are applicable regardless of whether a terminal is in a standby state or in a non-standby state.

Optionally, after the speech recognition apparatus recognizes the speech signal to obtain the recognition result, the method further includes:

performing, by the speech recognition apparatus, matching between the obtained recognition result and pre-stored speech instruction information; and controlling, by the speech recognition apparatus, execution of an operation corresponding to matched speech instruction information.

Figure 6:
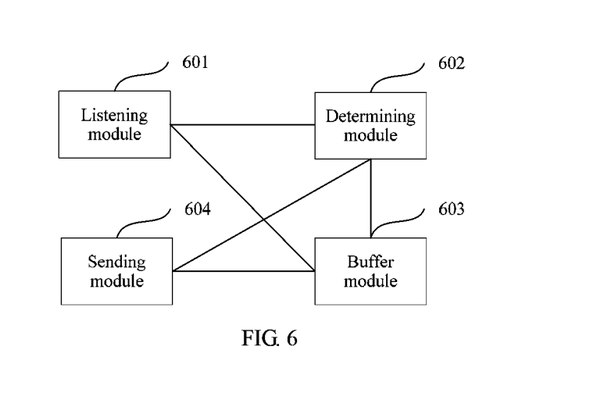
FIG. 6 is a schematic diagram of a speech wakeup apparatus according to an embodiment of the present invention.

An embodiment of the present invention further provides a speech wakeup apparatus. As shown in FIG. 6, the apparatus includes:

a listening module 601, configured to listen to speech information in a surrounding environment;

a determining module 602, configured to determine whether the speech information obtained by listening by the listening module 601 matches a speech wakeup model;

a buffer module 603, configured to: when the determining module 602 determines that the speech information obtained by listening by the listening module 601 matches the speech wakeup model, buffer speech information, of first preset duration, obtained by listening by the listening module 601; and a sending module 604, configured to send a trigger signal for triggering enabling of a speech recognition apparatus, where the trigger signal is used to instruct the speech recognition apparatus to read and recognize the speech information buffered by the speech wakeup apparatus, after the speech recognition apparatus is enabled.

By using solutions provided in this embodiment of the present invention, a user needs to send only one instruction, and requirements of the user can be met. In addition, the solutions are applicable regardless of whether a terminal is in a standby state or in a non-standby state. In addition, speech information obtained by listening is buffered, and a speech recognition apparatus enables itself and listens to speech information, and then recognizes the buffered speech information and the speech information obtained by listening, so that a loss of partial speech information can be avoided when the speech recognition apparatus starts to obtain speech information after being woken up, and speech recognition is improved.

Optionally, the determining module 602 is specifically configured to: when determining that the speech information obtained by listening matches predetermined wakeup speech information, determine that the speech information obtained by listening matches the speech wakeup model.

Optionally, the apparatus further includes:

an extraction module, configured to: when the determining module 602 determines that the speech information obtained by listening matches predetermined wakeup speech information, extract a voiceprint feature in a speech signal obtained by listening; where the determining module 602 is further configured to: when determining that the voiceprint feature extracted by the extraction module matches a predetermined voiceprint feature, determine that the speech information obtained by listening matches the speech wakeup model.

Figure 7:
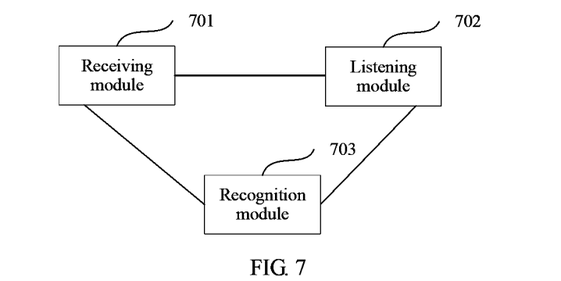
FIG. 7 is a schematic diagram of a speech recognition apparatus according to an embodiment of the present invention.

An embodiment of the present invention further provides a speech recognition apparatus. As shown in FIG. 7, the apparatus includes:

a receiving module 701, configured to receive a trigger signal sent by a speech wakeup apparatus, where the trigger signal is used to instruct the speech recognition apparatus to enable itself and recognize first speech information buffered by the speech wakeup apparatus;

a listening module 702, configured to: after the receiving module 701 receives the trigger signal, enable itself and listen to second speech information of second preset duration; and a recognition module 703, configured to recognize the first speech information buffered by the speech wakeup apparatus and the second speech information obtained by listening by the listening module, to obtain a recognition result.

By using solutions provided in this embodiment of the present invention, a user needs to send only one instruction, and requirements of the user can be met. In addition, the solutions are applicable regardless of whether a terminal is in a standby state or in a non-standby state.

Optionally, the apparatus further includes:

a matching module, configured to perform matching between the recognition result obtained after the recognition module 703 performs recognition and pre-stored speech instruction information; and an execution module, configured to perform an operation corresponding to matched speech instruction information.

Optionally, the apparatus further includes:

a disabling module, configured to: when the trigger signal is not received again within third preset duration after the receiving module receives the trigger signal, disable the speech recognition module.

By using solutions provided in this embodiment of the present invention, a user needs to send only one instruction, and requirements of the user can be met. In addition, the solutions are applicable regardless of whether a terminal is in a standby state or in a non-standby state. In addition, speech information obtained by listening is buffered, and a speech recognition apparatus enables itself and listens to speech information, and then recognizes the buffered speech information and the speech information obtained by listening, so that a loss of partial speech information can be avoided when the speech recognition apparatus starts to obtain speech information after being woken up, and speech recognition is improved.

Figure 8:
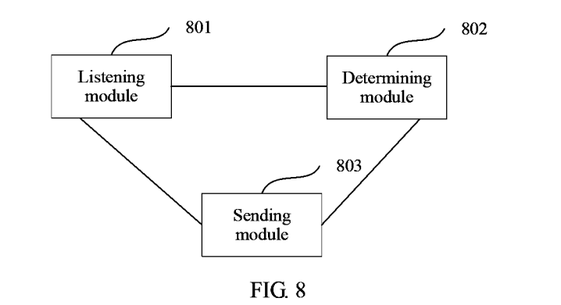
FIG. 8 is another schematic diagram of a speech wakeup apparatus according to an embodiment of the present invention.

An embodiment of the present invention further provides a speech wakeup apparatus. As shown in FIG. 8, the apparatus includes:

a listening module 801, configured to listen to speech information in a surrounding environment;

a determining module 802, configured to determine whether the speech information obtained by listening matches a speech wakeup model; and a sending module 803, configured to: when the determining module 802 determines that the speech information obtained by listening matches the speech wakeup model, send a trigger signal for triggering enabling of a speech recognition apparatus.

Optionally, the determining module 802 is specifically configured to: when determining that the speech information obtained by listening matches predetermined wakeup speech information, determine that the speech information obtained by listening matches the speech wakeup model.

Optionally, the apparatus further includes:

an extraction module, configured to: when the determining module 802 determines that the speech information obtained by listening matches predetermined wakeup speech information, extract a voiceprint feature in a speech signal obtained by listening; where the determining module 802 is specifically configured to: when determining that the extracted voiceprint feature matches a predetermined voiceprint feature, determine that the speech information obtained by listening matches the speech wakeup model.

Figure 9:
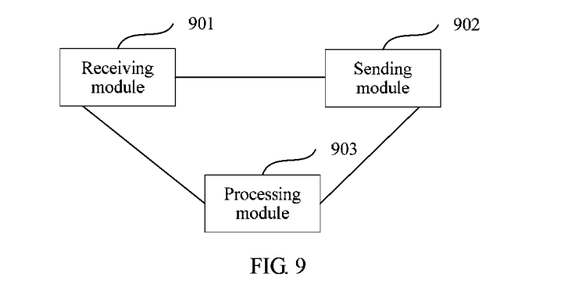
FIG. 9 is another schematic diagram of a speech recognition apparatus according to an embodiment of the present invention.

An embodiment of the present invention provides a speech recognition apparatus. As shown in FIG. 9, the apparatus includes:

a receiving module 901, configured to receive a trigger signal sent by a speech wakeup apparatus;

a sending module 902, configured to: after the receiving module 901 receives the trigger signal, enable itself and send a speech prompt instruction to a user; and a processing module 903, configured to record a speech signal entered by the user according to the speech prompt instruction, and recognize the speech signal, to obtain a recognition result.

By using solutions provided in this embodiment of the present invention, a user needs to send only one instruction, and requirements of the user can be met. In addition, the solutions are applicable regardless of whether a terminal is in a standby state or in a non-standby state.

Figure 10:
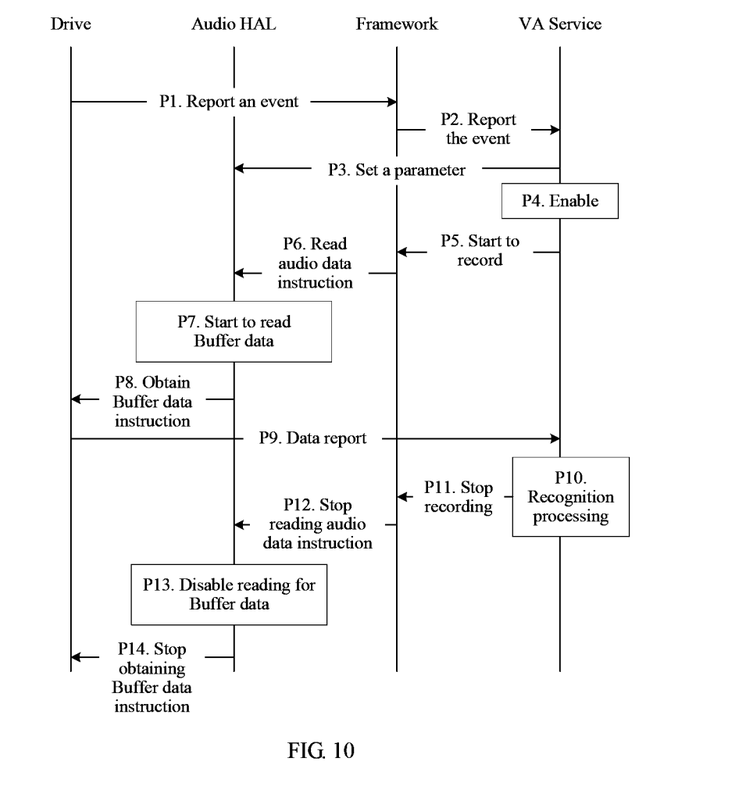
FIG. 10 is a schematic diagram of a speech recognition method according to an embodiment of the present invention.

In the following, embodiments of the present invention are specifically described with reference to a software implementation process, as shown in FIG. 10.

From a perspective of software, a speech recognition module can be divided into a drive layer, an audio hardware abstraction layer (Audio HAL), a framework (Framework) layer, a speech recognition engine (VA Service), and application setting (Setting).

P1. Report an event. Specifically, the drive layer reports a trigger event to the Framework after receiving the trigger signal from a DSP.

P2. Report the event. Specifically, the Audio HAL reports the foregoing trigger event to the VA Service.

P3. Set a parameter. Specifically, it is set to read data from a buffer.

P4. Enable the VA Service.

P5. The VA Service sends an enable record instruction to the Framework.

P6. The Framework sends a read audio data instruction to the Audio HAL after receiving the enable record instruction.

P7. The Audio HAL enables reading for Buffer data after receiving the read audio data instruction sent by the Framework.

P8. The Audio HAL sends an obtain Buffer data instruction to a drive, so that the drive sends the obtain Buffer data instruction to the DSP, and then the DSP sends the Buffer data to the drive.

P9. The drive reports the received Buffer data to the VA Service.

P10. The VA Service performs recognition processing on the Buffer data and the record data.

P11. The VA Service sends a stop recording instruction to the Framework.

P12. The Framework sends a stop reading audio data instruction to the Audio HAL after receiving the stop recording instruction.

P13. The Audio HAL disables reading for the Buffer data after receiving the stop reading audio data instruction sent by the Framework.

P14. The Audio HAL sends a stop obtaining Buffer data instruction to the drive.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A speech processing method, wherein the method is applied in a terminal comprising a speech wakeup apparatus and a speech recognition apparatus, the method comprising:
    listening, by the speech wakeup apparatus, to a first speech information, wherein the first speech information comprises a wakeup information for enabling the speech recognition apparatus and a first portion of a command word;
    determining that the wakeup information matches a speech wakeup model, and enabling the speech recognition apparatus;
    listening, by the speech recognition apparatus, to a second speech information after being enabled, wherein the second speech information comprises a second portion of the command word; and
    obtaining, by the speech recognition apparatus, a speech instruction information according to the first speech information and the second speech information, wherein the speech instruction information matches the command word, and the command word comprises the first portion of the command word and the second portion of the command word.

2. The method according to claim 1, further comprising performing an operation according to the speech instruction information.

3. The method according to claim 2, wherein the performing an operation according to the speech instruction information comprises: when the speech instruction information matches a pre-set speech instruction information, performing the operation according to the pre-set speech instruction information.

4. The method according to claim 1, further comprising: generating, by the speech wakeup apparatus, a trigger signal for enabling the speech recognition apparatus when the wakeup information matches a speech wakeup model, and sending the trigger signal to the speech recognition apparatus.

5. The method according to claim 1, wherein the determining that the wakeup information matches a speech wakeup model further comprises: if the wakeup information matches a predetermined wakeup speech information, extracting a voiceprint feature from the wakeup information, and determining the extracted voiceprint feature matches a predetermined voiceprint feature.

6. The method according to claim 5, wherein the voiceprint feature comprises an acoustic parameter that reflects the voiceprint feature, wherein the acoustic parameter comprises a pitch contour, a linear prediction coefficient, a spectral envelope parameter, a harmonic energy ratio, a resonant peak frequency and its bandwidth, a cepstrum, or a Mel-frequency cepstrum coefficient.

7. The method according to claim 1, wherein before the listening to a first speech information: the speech wakeup apparatus is in a state for listening to a speech information in a surrounding environment, and the speech recognition apparatus is inactive.

8. The method according to claim 7, wherein the listening to the speech information in the surrounding environment is executed in: a standby state, a non-standby state, or a screen-locked state.

9. The method according to claim 8, further comprising pre-storing pre-set speech instruction information.

10. The method according to claim 1, wherein the speech wakeup apparatus is a digital signal processor, and the speech recognition apparatus is an application processor or a CPU.

11. The method according to claim 1, wherein the listening to a first speech information comprises listening to the first speech information within a first preset duration, and the listening to a second speech information comprises listening to the second speech information within a second preset duration.

12. The method according to claim 11, further comprising disabling speech recognition function of the speech recognition apparatus automatically when a further trigger signal is not received again within a third preset duration after a previous trigger signal is received.

13. A non-transitory computer-readable medium having computer-executable instructions stored thereon for execution by a processor, wherein the instructions cause the processor to execute the method according to claim 1.

14. A terminal, comprising a speech wakeup apparatus and a speech recognition apparatus,
    the speech wakeup apparatus configured to listen to a first speech information, wherein the first speech information comprises a wakeup information for enabling the speech recognition apparatus and a first portion of a command word;
    the speech recognition apparatus configured to listen to a second speech information after being enabled, wherein the second speech information comprises a second portion of the command word; and
    the speech recognition apparatus configured to obtain a speech instruction information according to the first speech information and the second speech information, wherein the speech instruction information matches the command word, and the command word comprises the first portion of the command word and the second portion of the command word.

15. The terminal according to claim 14, further comprising an execution module configured to perform an operation according to the speech instruction information.

16. The terminal according to claim 14, the speech wakeup apparatus further configured to: generate a trigger signal for enabling the speech recognition apparatus when the wakeup information matches a speech wakeup model, and send the trigger signal to the speech recognition apparatus; and
    the speech recognition apparatus further configured to enable speech recognition function according to the trigger signal.

17. The terminal according to claim 14, the speech wakeup apparatus further configured to: extract a voiceprint feature from the wakeup information if the wakeup information matches a predetermined wakeup speech information, and determine the extracted voiceprint feature matches a predetermined voiceprint feature.

18. The terminal according to claim 14, wherein before listening to the first speech information: the speech wakeup apparatus is in a state for listening to a speech information in a surrounding environment, and the speech recognition apparatus is inactive.

19. The terminal according to claim 14, wherein before listening to the first speech information, the terminal is in: a standby state, a non-standby state, or a screen-locked state.

20. The terminal according to claim 14, the speech wakeup apparatus further configured to listen to the first speech information within a first preset duration; and
   the speech recognition apparatus is further configured to listen to the second speech information within a second preset duration.

21. The terminal according to claim 20, the speech recognition apparatus further configured to disable a speech recognition function of the speech recognition apparatus automatically when a further trigger signal is not received again within a third preset duration after the previous trigger signal is received.

\* \* \* \* \*